(12) United States Patent
Frank

(10) Patent No.: US 7,287,426 B2
(45) Date of Patent: Oct. 30, 2007

(54) LIQUID LEVEL INDICATORS

(75) Inventor: Peter Andrew Frank, London (GB)

(73) Assignee: Gentech International Limited, Girvan, Ayrshire (GB)

( * ) Notice: Subject to any disclaimer, the term of this patent is extended or adjusted under 35 U.S.C. 154(b) by 0 days.

(21) Appl. No.: 10/800,149

(22) Filed: Mar. 12, 2004

(65) Prior Publication Data
US 2005/0081623 A1   Apr. 21, 2005

(30) Foreign Application Priority Data
Mar. 13, 2003   (GB) ................... 0305805.4

(51) Int. Cl.
*G01F 23/22* (2006.01)
(52) U.S. Cl. ....................................... 73/295
(58) Field of Classification Search ............. 73/295
See application file for complete search history.

(56) References Cited

U.S. PATENT DOCUMENTS

| | | | |
|---|---|---|---|
| 4,672,842 A * | 6/1987 | Hasselmann | 73/49.2 |
| 4,761,638 A * | 8/1988 | Lozano, Jr. | 340/620 |
| 2002/0011105 A1 * | 1/2002 | Snelling et al. | 73/295 |

FOREIGN PATENT DOCUMENTS

| | | |
|---|---|---|
| DE | 686 778 | 1/1940 |
| DE | 36 32 855 | 3/1988 |
| DE | 40 11 639 | 10/1991 |
| GB | 2 277 592 | 11/1994 |
| WO | 97/19328 | 5/1997 |

OTHER PUBLICATIONS

Patent Abstracts of Japan. vol. 0181, No. 59. Mar. 16, 1994. JP 5332808.

* cited by examiner

*Primary Examiner*—Hezron Williams
*Assistant Examiner*—Paul M West
(74) *Attorney, Agent, or Firm*—Renner, Otto, Boisselle & Sklar, LLP

(57) ABSTRACT

A liquid level indicator, suitable for determining the level of a volatile liquid within a container, includes temperature sensors spaced vertically apart from each other. A processor processes the outputs of the temperature sensors and produces an indication, such as an audible indication by an audible alert device, when liquid level is detected. The determination of liquid level can be by one or more of various temperature processing techniques, including difference in temperature between temperature sensors, and/or difference in temperature over time at one or more of the temperature sensors.

19 Claims, 13 Drawing Sheets

LIQUID LEVEL INDICATORS

The present invention relates to a device for and method of indicating a liquid level in a container, in particular, although not exclusively, for volatile liquids.

BACKGROUND OF THE INVENTION

Most gases will condense into a liquid form if the temperature of the gas is reduced sufficiently. However, the temperature at which gas to liquid condensation takes place at atmospheric pressure is often very low, for example, at atmospheric pressure propane gas condenses to a liquid at −43° C.

The temperature at which condensation occurs can be increased by increasing the pressure of the gas. Some gases, such as propane and butane, for example, can be easily condensed into a liquid form by compressing the gas. Such compressed gases are often known as volatile liquids, because they will vaporize to form a gaseous state as soon as the pressure is reduced. Therefore, in order to maintain the compressed gas in the liquid form the pressure must be maintained. This is usually achieved by storing the volatile liquid in pressurized containers.

To allow for removal of the gas from the pressurised container the container is usually fitted with a tap arrangement. When the tap is opened, the pressure in the container is reduced and the volatile liquid begins to vaporize. The vapor exits the container via the tap and will continue to do so until the tap is closed. After the tap is closed, the volatile liquid will continue to vaporize until the pressure inside the container becomes sufficient to maintain the gas in the liquid state.

As the volatile liquid vaporizes, energy is drawn from the body of the liquid to fuel the vaporization process. Therefore, the temperature of the body of liquid will fall as the liquid vaporizes.

A problem associated with pressurized containers of volatile liquids is that it is generally difficult to detect the level of liquid left in the container. Therefore, it is difficult to ascertain when the container will become emptied. This is a particular problem in use of liquid propane and butane cylinders with, for example, gas powered grills, patio heaters, room heaters, refrigerators, cookers and the like. In such instances it is unusual for a consumer to have a spare fuel cylinder available, and it can be very inconvenient if the gas bottle becomes empty part way through cooking a meal or such like. A device is available for indicating the liquid level remaining in a propane gas bottle. The device comprises a flexible sheet in which a plurality of rows of temperature-sensitive sensors are embedded. The device contains a magnetic material so that it can be attached to the exterior sidewall of a gas bottle just above the base. In use, each sensor of the device senses the temperature of the bottle and the sheet changes color at the points where a temperature at or below a set temperature is detected. Thus the device is arranged to change color below the liquid level.

Whilst such a device is cheap to manufacture and easy to use, it can be adversely affected by external temperature changes, such as sunlight and/or wind or rain incident on the device. Furthermore, the device needs to be regularly observed.

SUMMARY OF THE INVENTION

It is an object of preferred embodiments of the present invention to provide an alternative liquid level indicator.

The present invention provides a liquid level indicator comprising a plurality of temperature sensors spaced apart from one another, a processor operable to process the output of at least two of the temperature sensors, and an indicator means for providing an indication of the liquid level in response to an output of the processor.

Suitably, the liquid level indicator indicates the level of a volatile liquid in a pressurized container.

Suitably, the liquid level indicator comprises two temperature sensors spaced one above the other when the indicator device is arranged for use. However, the liquid level indicator may comprise more than two temperature sensors. In the latter case, at least one of the temperature sensors should be arranged to be above the other sensors when the indicator device is arranged for use. Preferably, all of the temperature sensors are arranged one above another when the indicator device is arranged for use. In addition, the processor should process the output of two temperature sensors that are arranged to be one above another sensor when the indicator device is arranged for use.

Any suitable temperature sensor may be used. One or more of the temperature sensors suitably comprises a thermistor.

The liquid level sensor is preferably designed to take the output of the at least two temperature sensors of the plurality of temperature sensors at pre-set time intervals. The output of the at least two temperature sensors of the plurality of temperature sensors taken at each pre-set time interval is preferably taken at substantially the same time. The liquid level indicator may be designed to take intermittent readings from the temperature sensors at any suitable time interval. For example, the liquid level indicator may be designed to take a reading from the temperature sensors once every 30 seconds, once every minute, once every 5 minutes or once every 10 minutes.

The processor may comprise any suitable device or arrangement. Preferably, the processor includes a microchip. The processor is suitably designed to process the output signals from the two at least temperature sensors in a pre-set manner against one or more pre-set conditions, and produce an actuation signal to the indicator means dependent upon the results of the comparison.

The processor may be programmed to process the output signals from the temperature sensors in various ways. For example, the processor may simply compare the output signal, for example the output voltage, of one or more pairs of the temperature sensors to determine the difference between the outputs. This difference may then be compared to one or more pre-set conditions to determine what signal to output to the indicator means.

Alternatively, or in addition, the microchip may convert the output from one or more of the temperature sensors into a calculated temperature value using a look-up table, or the like. The processor may then be used to determine the temperature difference between two calculated temperature values, which temperature difference may then be compared to one or more pre-set conditions to determine what signal to output to the indicator means.

The processor may store measurements taken from the temperature sensors at some or all of the time intervals. The processor may store the measurements taken from one or more sensor. The processor may store the measurements as either a voltage measurement or as a calculated temperature value. Alternatively, or in addition, the processor may store the differences between the measurements, either as a difference in the voltage measurements or as a temperature difference.

The actuation signal generated by the processor to activate the indication means may by a continuous signal, an intermittent signal or no signal.

For example, the processor may produce a continuous actuation signal that varies, for example in frequency, depending upon the particular state the indicator is required to indicate.

Alternatively, the processor may be programmed to produce an actuation signal only if the liquid level is detected as being at or below the level of the liquid level indicator device. In this case, the indicator means may only be activated when the liquid level is detected as being at or below the level of the liquid level indicator device and a signal is emitted by the processor, and otherwise the indicator means will remain inactive. Alternatively, the indicator means may provide an indication that the liquid level is above the liquid level indicator when no signal is received from the processor, and change the indication when a signal is received from the indicator. The indication of low liquid level may also be different when the liquid level is in the region of the liquid level indicator device from when the liquid level is below the liquid level indicator device.

As a further alternative, the processor may be programmed to issue an intermittent signal or a signal of differing frequency dependent upon the liquid level detected by the indicator device. In this case, the indicator means could use the actuation signal to provide a continuous indication of the liquid level, which changes as the liquid level falls below the level of the indicator.

The indicator means may comprise an audible alarm, for example a piezo-electric sound generator. The audible alarm may comprise a distinctive tune, in order to make the alarm more easily distinguished over other electronic sounds that may be emitted in the surrounding area. Alternatively, or in addition, the indicator may comprise a visual display such as an LED or a liquid crystal display (LCD).

Suitably, the processor is also designed to detect when the container to which it is attached is in use. This may be achieved by programming the processor to compare the measurements of one or more of the plurality of temperature sensors at one point in time with the measurements of the same sensor at a later point in time against one or more pre-set conditions. Alternatively, or in addition, the processor may be programmed to compare the difference in voltage measurements or the temperature difference, both referred to above, at one point in time with the difference in voltage measurement or temperature difference at a later point in time, against one or more pre-set conditions. The processor may look for a difference in the readings in either direction, i.e. either positive or negative.

In this case, the processor may be programmed to send out an actuation signal to the indicator means only when the processor detects that the container is in use.

Suitably, the processor, the plurality of temperature sensors and the indicator means are mounted onto a printed circuit board.

The liquid level indicator is suitably powered by one or more batteries, preferably by two AA batteries.

The level indicator may comprise operation indicative means to indicate that the liquid level indicator is operational. The operation indicative means may comprise one or more light emitting diodes (LED's), which may be arranged to provide either an intermittent or a continuous display when there is sufficient power in the batteries to operate the liquid level indicator. The one or more LED's of the operation indicative means may be provided by any LED of the indicator means. Alternatively, the LED's of the operation indicative means may be separate from any LED of the indicator means.

Suitably, the liquid level indicator includes a housing. The housing may comprise a main body and a cover. The cover may be attached to the main body, but is suitably separable from the main body of the housing.

Suitably, the main body contains, part at least of each of the plurality of temperature sensors, the processor, part at least of the indicator means and the one or more battery. Suitably, part at least of each of the plurality of temperature sensors extends from an exterior surface of the housing. The housing may further comprise a divider to separate the electronic components from the one or more battery, so that the battery can be changed without exposing the electronic components.

Suitably, the housing has a generally rectangular conformation having a front wall, a back wall, a top wall, a bottom wall and two opposing sidewalls. One or more of the walls of the housing may be molded to have a non-planar conformation.

The front wall of the main body may be molded to have a box of generally rectangular conformation extending therefrom. Suitably, the processor, the plurality of temperature sensors, and the indicator means are located within the box extending from the front wall. Suitably, the one or more battery is located in the main compartment of the main body. Preferably, a dividing plate is located inside the main body of the housing to separate the interior of the rectangular box extension of the front wall from the main compartment of the main body.

The main body of the housing suitably provides the front wall, the box extension from the front wall, the bottom wall, an interior surface of a top wall and part at least of each sidewall of the housing. The cover of the housing suitably provides the back wall, part at least of each side wall, and an exterior surface of the top wall.

Suitably, in use, the housing is arranged with the front wall facing a container to which the liquid level sensor is to be attached. Part at least of each of the plurality of temperature sensors extends from the surface of the front wall, such that when the device is attached to a container in use, each temperature sensor contacts the surface of the container to which the device is attached. One at least of the plurality of temperature sensors should be above others of the plurality of temperature sensors when the liquid level indicator is arranged for use.

Preferably, the housing is designed to provide the temperature sensors with a degree of protection from the external environment, including heat and/or moisture. Suitably, each of the plurality of temperature sensors is spaced below the top wall of the housing, such that the upper part of the housing will provide some protection for the uppermost temperature sensor from the external environment. Suitably, each of the temperature sensors is located towards the central meridian of the front wall of the housing, such that the sides of the housing will provide a degree of protection for the temperature sensors from the external environment.

Protection of the sensors may be effected by shaping the housing such that parts of the housing provide a shield against the external environment. For example, the upper end, when arranged for use, may include a lip extending from an edge of the cover. Preferably, the lip extends from the top wall of the cover. The housing may further comprise a skirt around the region in which the temperature sensors are located extending from the surface of the housing, to provide a further shield from the external environment.

The lip and skirt portions may be provided by molded sections of the housing, which extend from a surface of the housing. Alternatively, a separate element may be attached to the surface of the housing to provide the lip and skirt portions. Any suitable material may be used to provide the shielding portions. For example, a foam strip may be attached to the exterior of the housing in appropriate locations to shield the temperature sensors from the external environment.

The shielding portions may be arranged such that a sealed space around the temperature sensors is effectively formed when the liquid level indicator is arranged against a surface for use.

The liquid level sensor may further comprise attachment means for attaching the device to a container of liquid to be monitored. The attachment means may be any suitable means, for example, handles and a strap, but is preferably provided by one or more magnets. Suitably, the one (or more) magnet is contained in the housing in the region of the front wall. Preferably, the one (or more) magnet is located in the box extending from the front wall.

The housing may include a hole in a wall thereof to allow sound emitted from any audio alarm to be transmitted more effectively from the device. The hole is suitably located in the region of the sound generator. The hole is suitably filled by the sound generator, such that substantially no opening between the exterior environment and the interior of the housing exists at that location. The housing may be shaped to more effectively allow for transmission of the sound from the level indicator.

The housing may comprise a drainage hole to allow liquid entering the housing to drain therefrom.

Suitably, the section of the housing containing the one or more battery is substantially splashproof.

In use, the liquid level indicator is suitably attached to the lower part of a pressurized container holding a volatile liquid. The liquid level indicator is arranged on the container such that two at least of the plurality of temperature sensors are arranged spaced one above another.

The processor periodically takes a measurement indicative of the temperature of the surface of the container at that location of each sensor. The output from each temperature sensor is transmitted to the processor. The processor may then convert the measurement of the temperature sensors into a calculated temperature value. The processor then compares the measurement of at least two temperature sensors to determine the difference between the pair of sensors. If a difference is greater than a pre-set amount, a signal will be transmitted by the processor to activate the indicator means.

If the level indicator is also programmed to compare different readings from the same temperature sensor at different times, an additional step will be carried out by the processor. In this case, the processor will receive, and preferably store, a set of temperature measurements at one point in time and then will receive, and preferably store, another set of temperature measurements at a later point in time. The processor will then compare the measurement of each sensor taken at the later time with the measurement of the same sensor taken at the earlier time, to determine whether or not the overall temperature of the container is falling with time. If the processor assesses that the overall temperature of the bottle is falling, or at least not rising, with time, the processor will then proceed to compare the temperature readings of the temperature sensors at one of the points in time, as described above, to determine whether or not a signal should be sent to activate the indicator.

As the compressed liquid is being used, the liquid will be vaporizing and latent heat of vaporization will be removed from the body of the liquid remaining in the container. Hence, the temperature of the body of liquid in the container will gradually decrease with time.

In addition, although the temperature of the body of liquid will generally decrease whilst the liquid is being used, at any point in time, the temperature of the body of liquid will be substantially uniform throughout. However, the gaseous vapor above the liquid in the container will exhibit an increasing temperature profile from the liquid surface up towards the top of the container as a result of external environmental heating.

Therefore, if a comparison of the temperature measurement of two or more temperature sensors at one point in time shows substantially no temperature difference, then either both of the sensors are located below the liquid surface, or the container is not in use. If a comparison of the temperature measurements of two of more sensors at one point in time shows a difference, the surface of the liquid is probably at or below the level of the sensors. The processor may be programmed to monitor the variation of measurements taken by each sensor as the container is in use, in order to determine between when the liquid level is at the position of the indicator device and when the liquid level is below the position of the liquid level indicator.

The processor may send a different signal to the indicator means dependent upon which of the above-mentioned conditions applies. The indicator means may provide a continuous signal that changes to correspond to the condition detected, or the indicator means may provide an alarm signal only if the liquid level is detected as being in the region of the temperature sensors, or below the level indicator. In each case, the indicator means may issue a different type of indication to signal when the liquid level is between the sensors or when the liquid level is below the level indicator device.

The present invention further provides a method of indicating a liquid level for a volatile liquid in a pressurized container comprising, taking a first measurement indicative of temperature at a first point on the pressurized container, taking a second measurement indicative of temperature at a second point on the pressurized container, the second point being below the first point, processing the first and second measurements to determine the difference between the two measurements and then comparing the difference against a pre-set condition, sending a signal to an indicator means dependent upon the result of the comparison step, and indicating the liquid level in accordance with the indicator signal.

The method may further include, taking a second set of temperature measurements at the first and second points at a later time. In this case, the processing step suitably further comprises, comparing the measurement from a temperature sensor at the later time to the measurement from the same temperature sensor at the earlier time to determine whether or not the overall temperature of the container is falling or at least not rising with time. This processing step is suitably carried out before the processor compares the measurements taken from different temperature sensors at the same time, as set out above. If the temperature of the container is falling with time, then the method may continue with the processing step set out above. If the temperature of the container is not falling with time, then the method may return to the preceding measuring step. In this case, the method may not involve sending a signal to the indicator means until a fall of temperature of the container with time is detected.

The measurement indicative of temperature taken from the temperature sensors may be processed as a voltage output from the sensors. Alternatively, the output of the temperature sensors may be converted to a calculated temperature value before processing commences.

If a comparison of the temperature measurements at one point in time shows substantially no temperature difference, then the sensors are more than likely located below the liquid surface or the container is not in use. In this case, the method may involve sending no signal to the indicator means and the indicator means may provide no indication of the liquid level. Alternatively, if the indicator means receives no signal, the indicator means may produce an indication that the liquid level is above the location of the liquid level indicator.

If a comparison of the temperature measurements at one point in time shows a difference, the surface of the liquid is probably at or below the first and/or second points on the container. In this case, a signal is sent to the indicator means, and the indicator means provides an indication that the liquid level is at or below the first point and/or the second point on the container.

A different signal may be sent to the indicator means dependent upon which of the above-mentioned conditions applies. The indicator means may provide a continuous indication that changes to correspond to the condition detected, or the indicator means may provide an indication of the liquid level only if the liquid level is detected as being between the first and second points on the container, or below the level indicator. In each case, the indicator means may issue a different type of indication to signal when the liquid level is between the sensors or when the liquid level is below the level indicator device.

The present invention advantageously provides a liquid level indicator and method of indicating a liquid level that is less susceptible to interference from external environmental effects than the prior art device. In addition, a preferred embodiment of the present invention provides for indicating the liquid level only when the container to which the liquid level indicator is attached is in use. Furthermore, if the liquid level indicator comprises an audible alarm, it need not be regularly visually checked to determine the liquid level. In this case, a user will be alerted to the low liquid level.

The intermittent taking of readings from the temperature sensors prolongs the useful life of the batteries.

All features of any embodiment of the present invention may be used with any other embodiment of the present invention.

BRIEF DESCRIPTION OF THE DRAWINGS

The present invention will now be described, by way of example only, with reference to the following schematic drawings, in which:—

DETAILED DESCRIPTION

Figure 9:
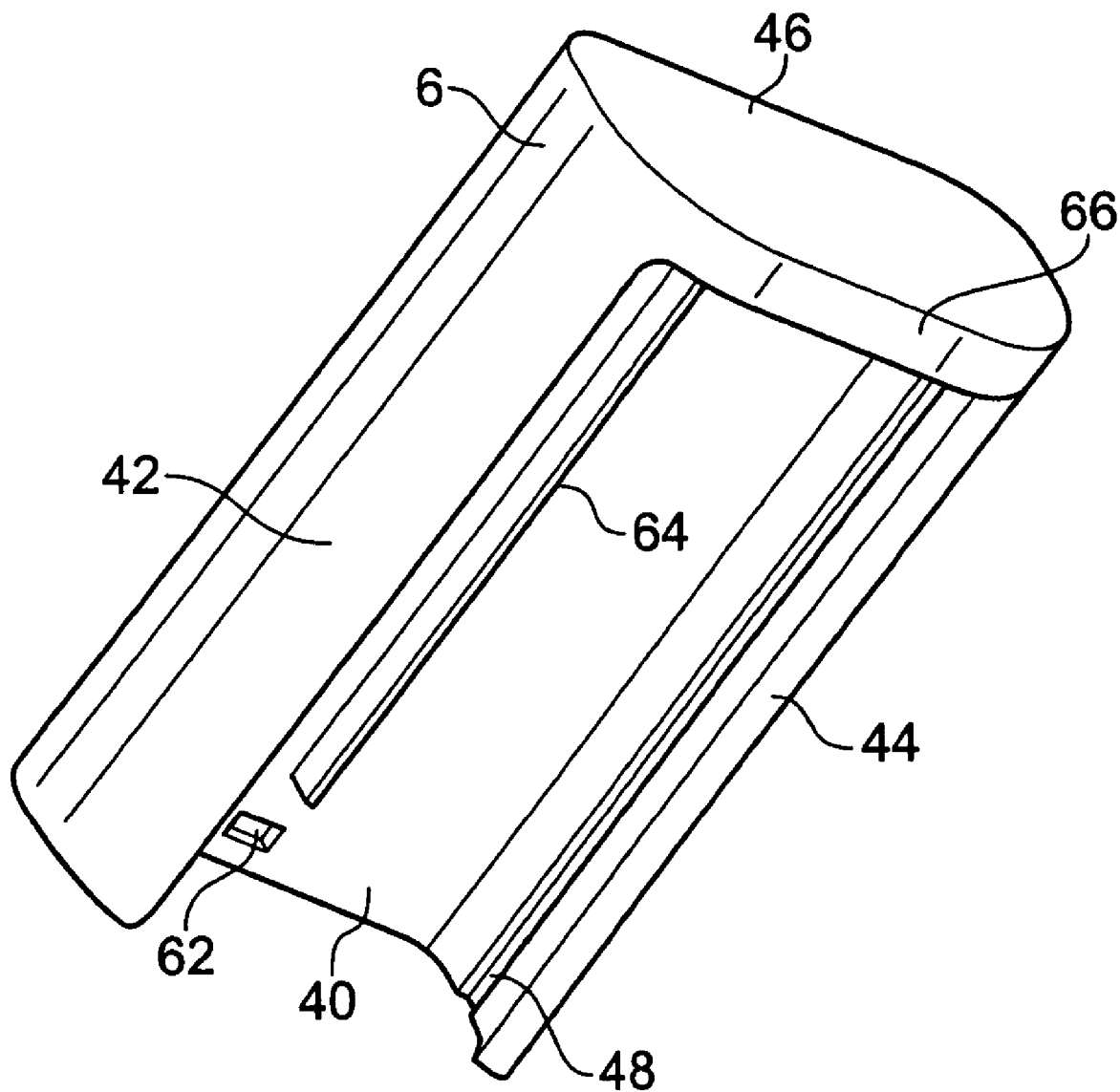
FIG. 9 is a perspective view from one side and the front of the cover of the housing of the device of FIG. 1.
Figure 10:
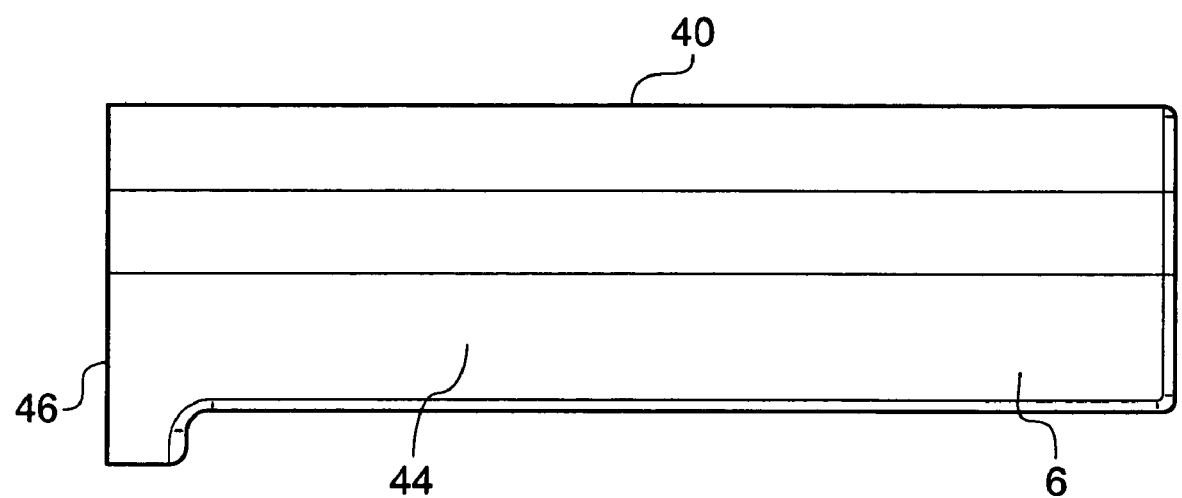
FIG. 10 is a side view of the cover of FIG. 9.

The device of FIGS. 1 to 10 comprises a housing 2 having a main body 4 (FIG. 8) and a cover 6 (FIGS. 9 and 10).

Figure 1:
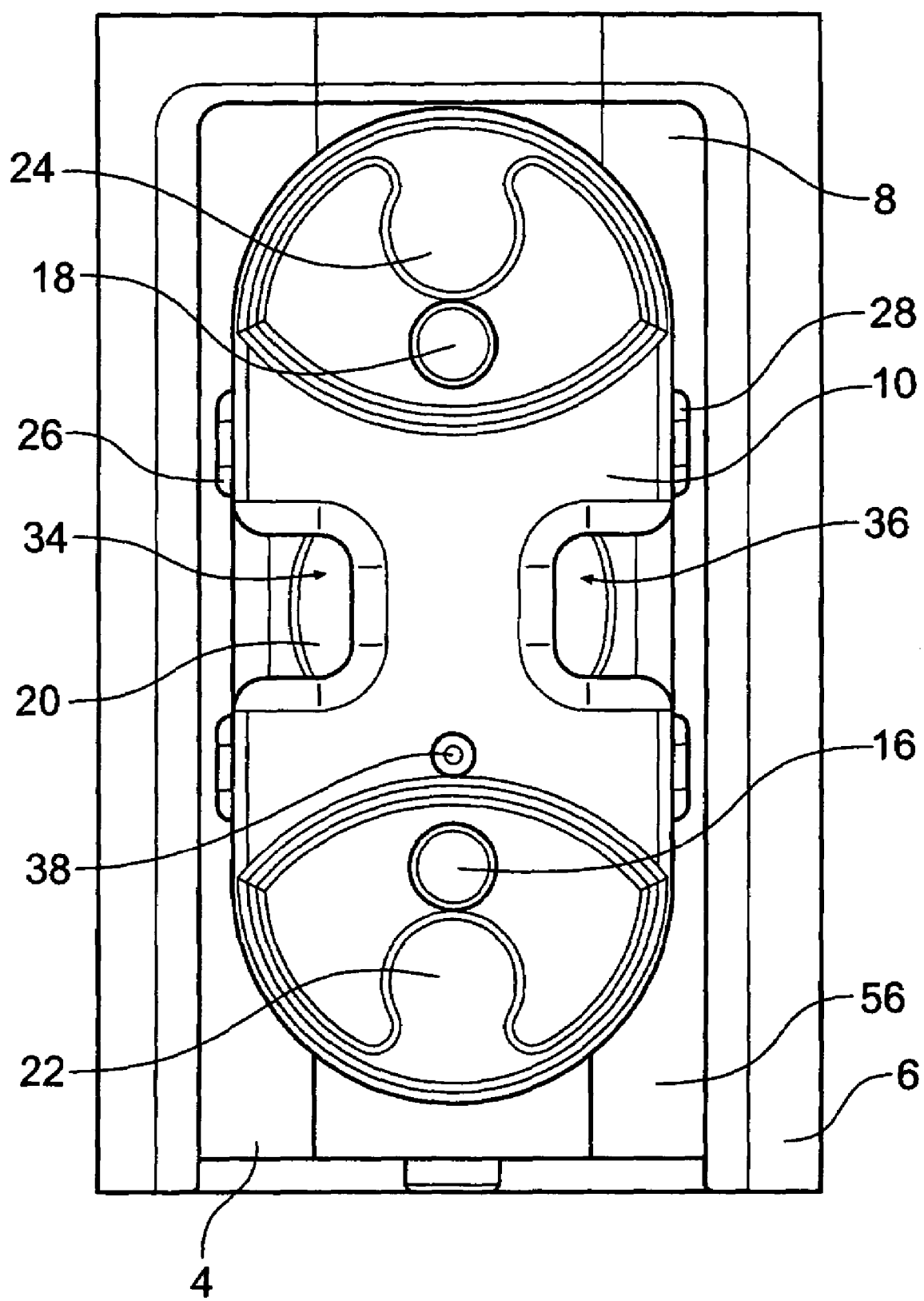
FIG. 1 is a front view of a liquid level indicator.
Figure 2:
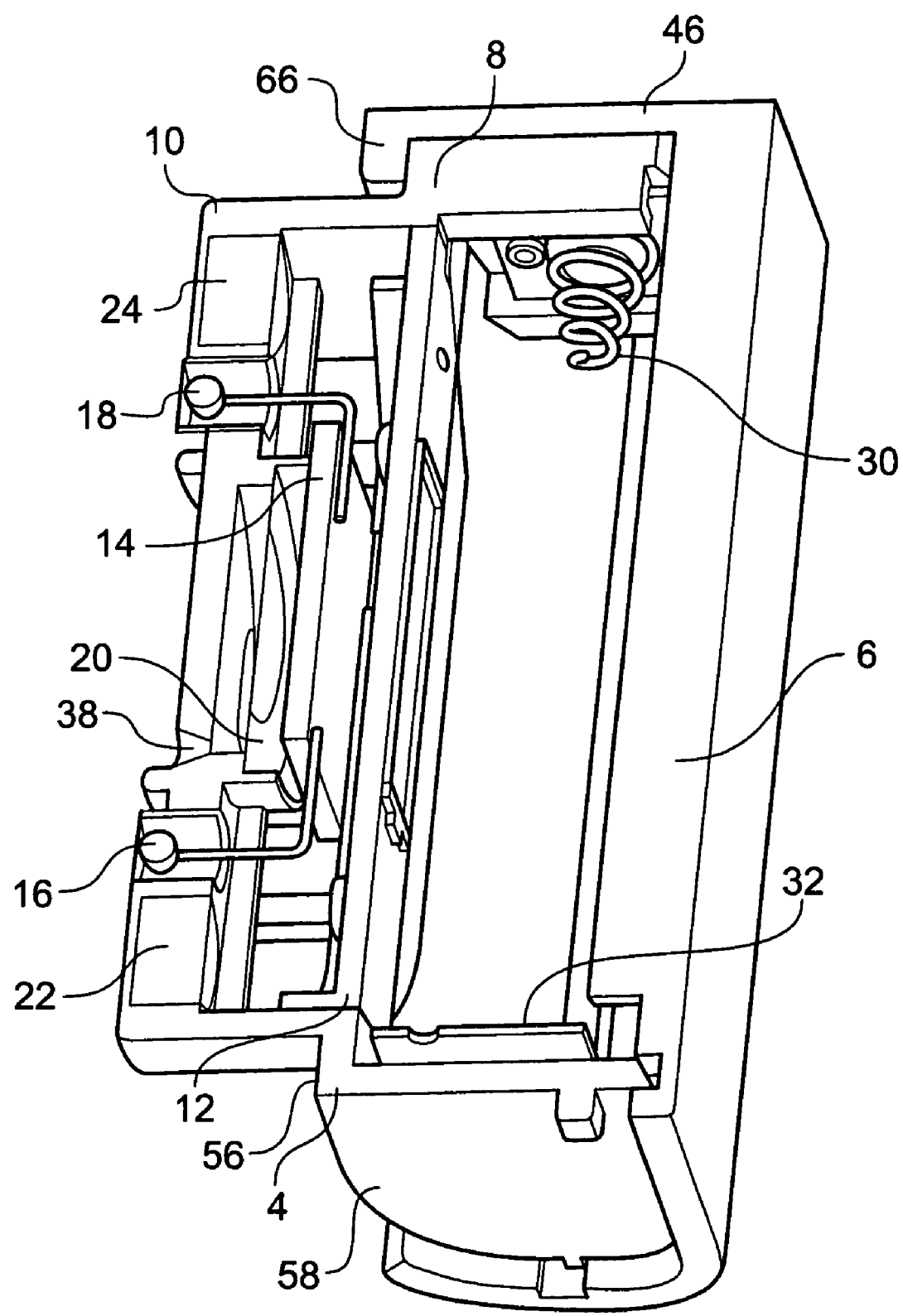
FIG. 2 is a cross-sectional side view of the device of FIG. 1.
Figure 3:
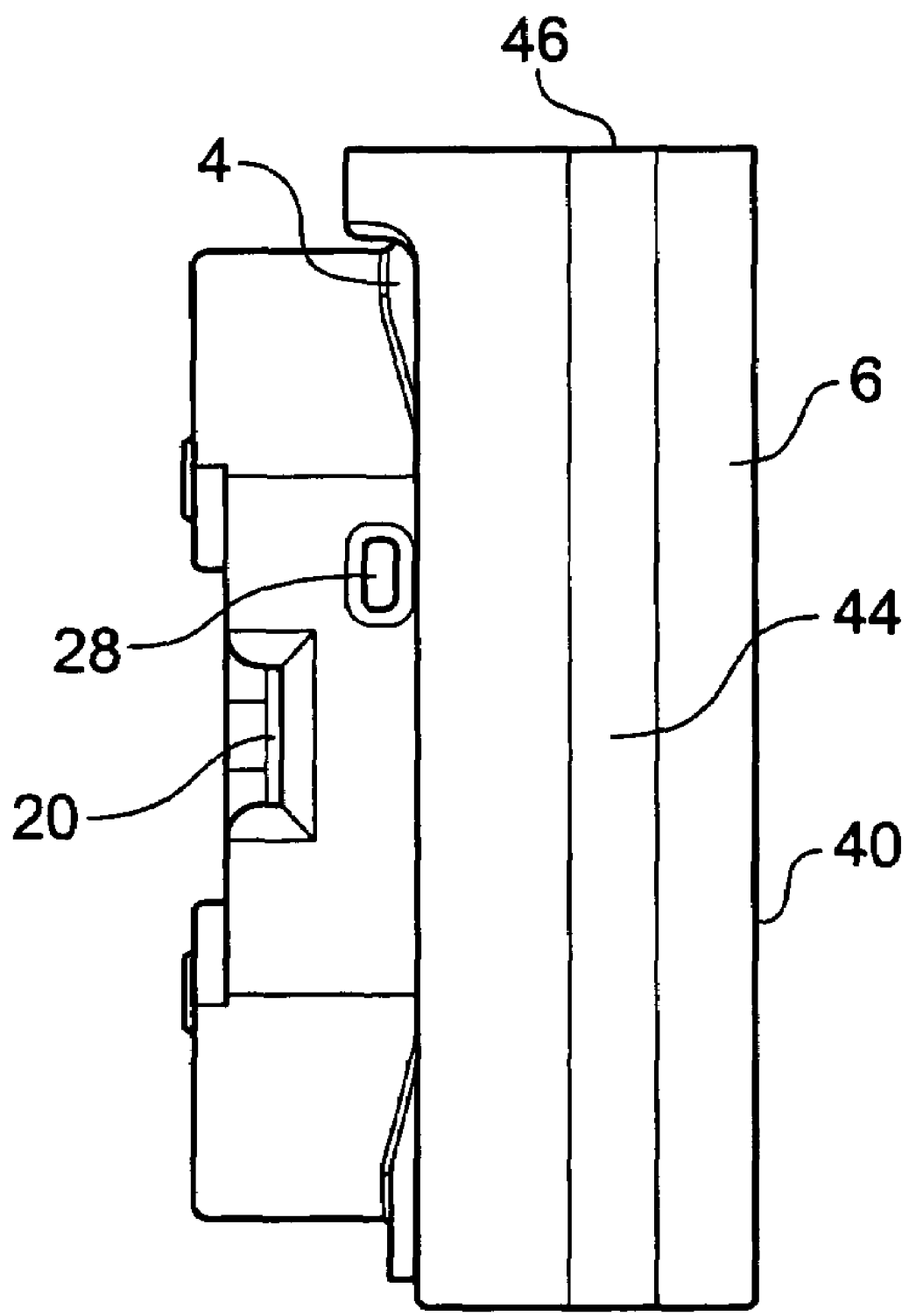
FIG. 3 is a side view of the device of FIG. 1.
Figure 4:
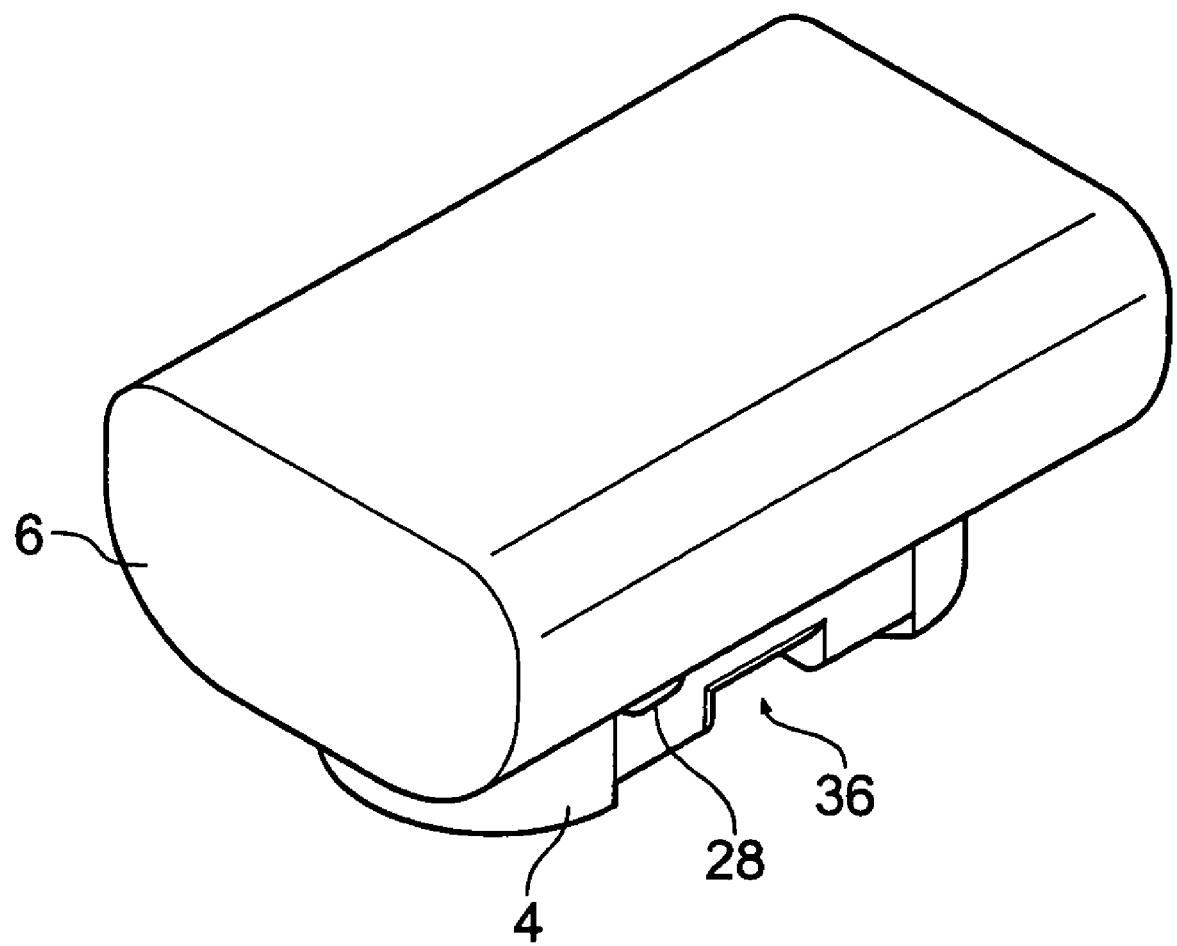
FIG. 4 is a perspective view from the top end and the rear of the device of FIG. 1.
Figure 5:
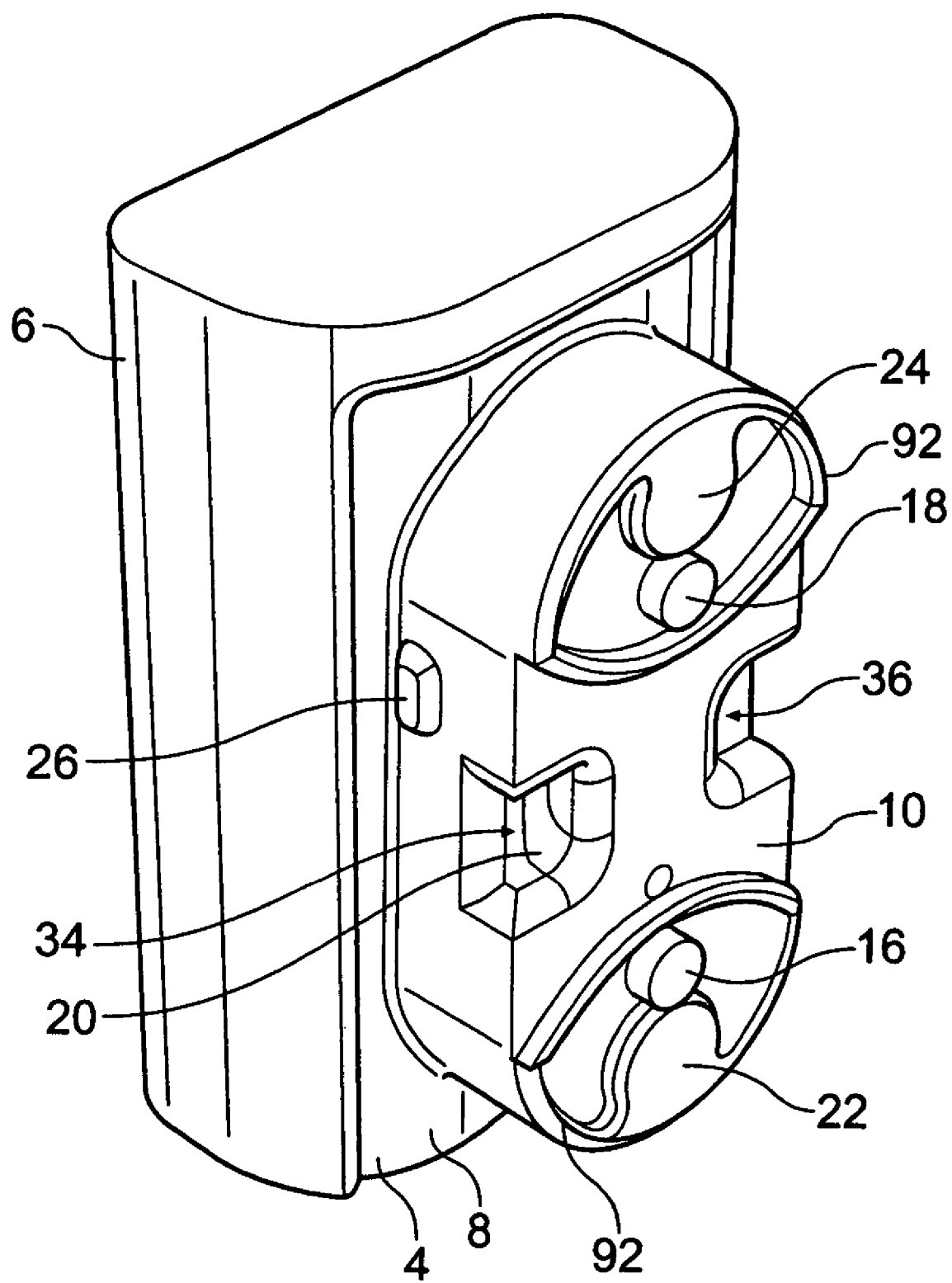
FIG. 5 is a perspective view from the front of the device of FIG. 1.
Figure 6:
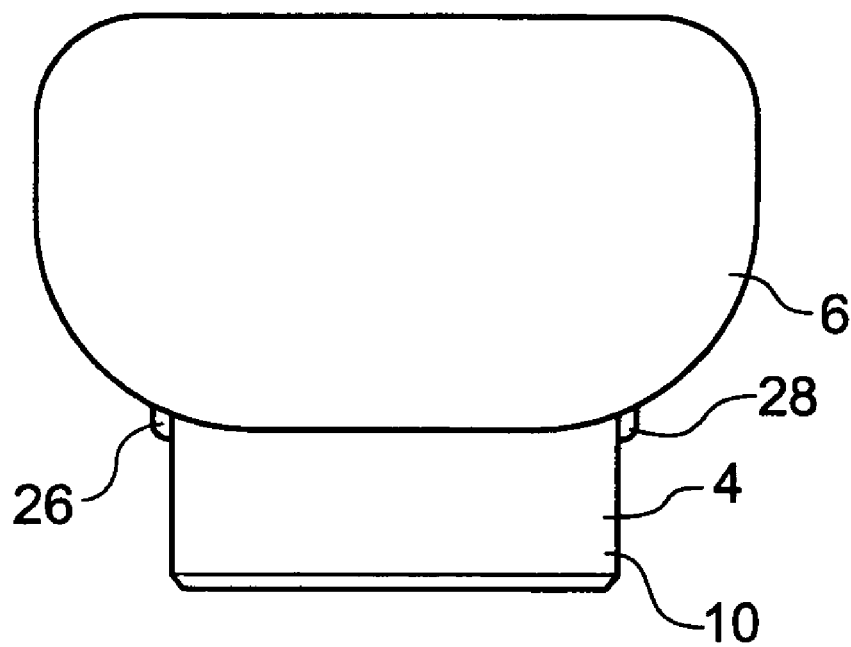
FIG. 6 is a plan view from the top of the device of FIG. 1.
Figure 7:
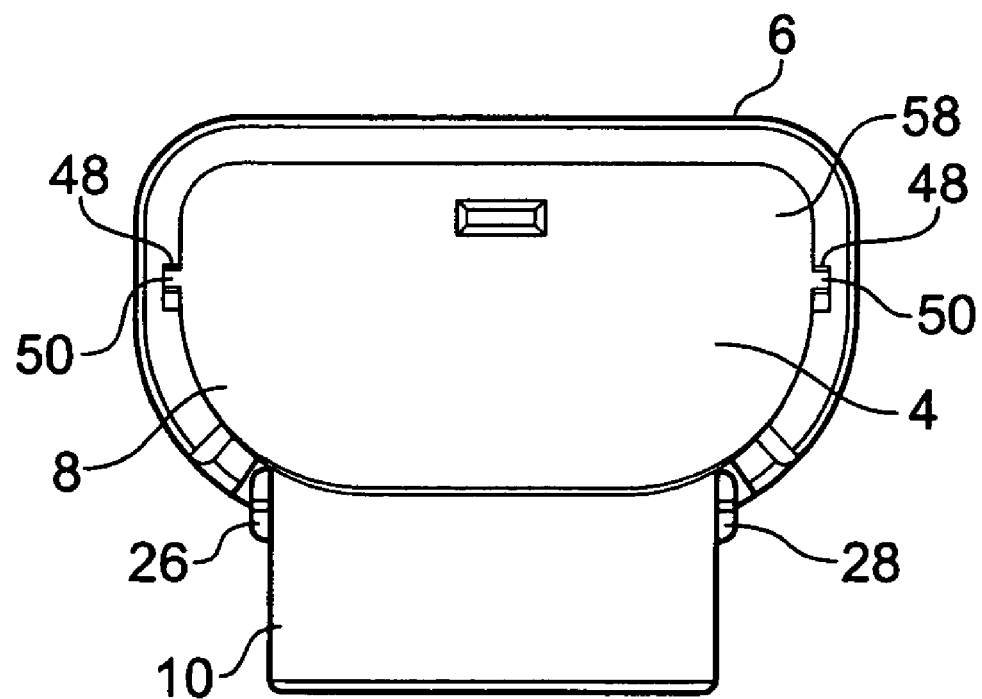
FIG. 7 is plan view from underneath the device of FIG. 1.
Figure 8:
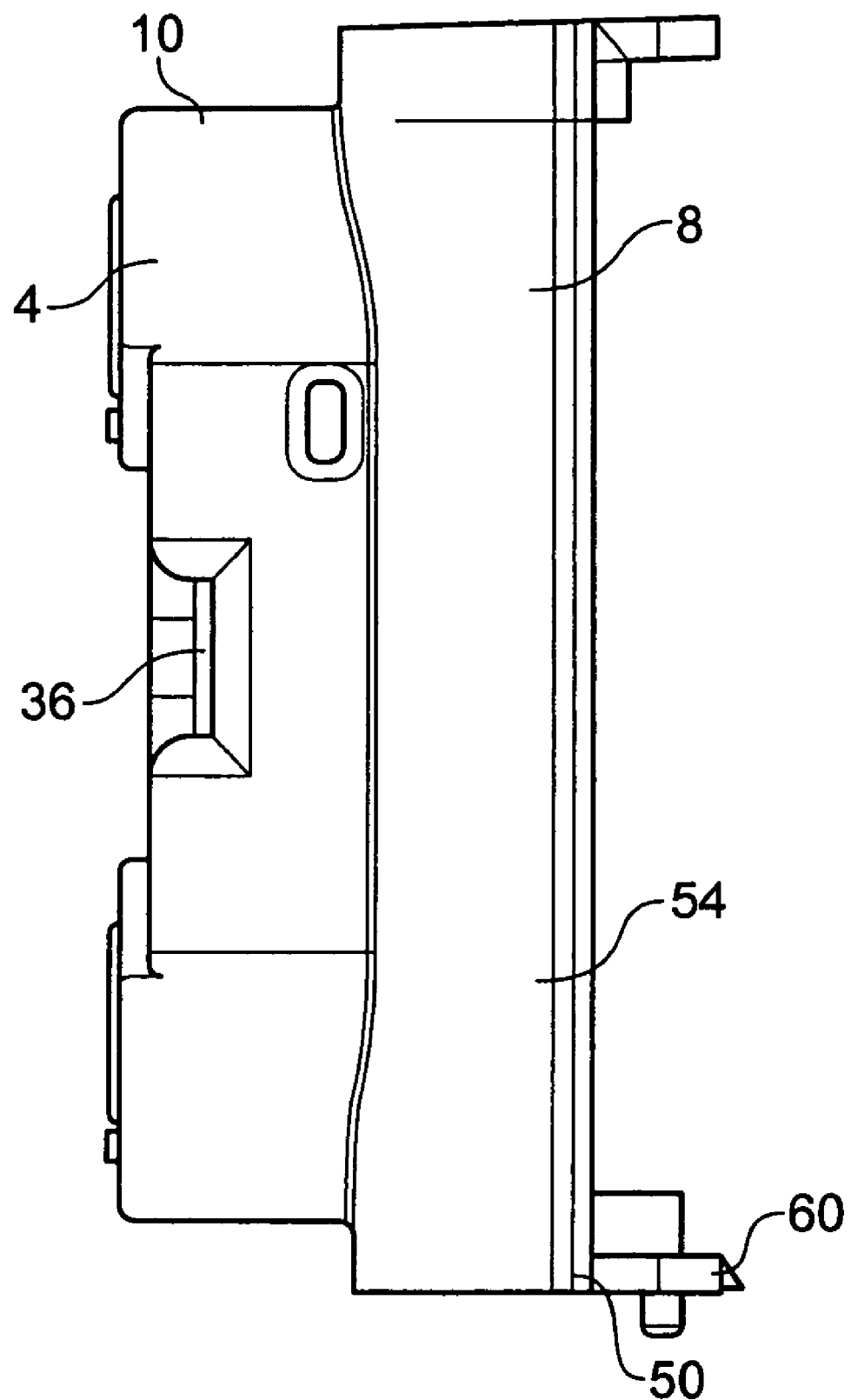
FIG. 8 is a side view of the main body of FIG. 1.

The main body 4 comprises a generally rectangular main portion 8 and a box-like, generally rectangular portion 10 extending therefrom. The main portion 8 and the box-like portion 10 are separated by means of a dividing plate 12 (FIG. 2). The box-like portion 10 contains a printed circuit board (PCB) 14, two temperature sensors (preferably thermistors) 16, 18, a piezo-electric sound generator 20, magnets 22 and 24, and LED lenses 26 and 28. The main portion 8 of the main body 4 comprises electrical contacts 30, 32 connected to the PCB 14 by wires. The main portion 8 is designed to receive two AA batteries (not shown) in a side-by-side relationship. The temperature sensors 16, 18 are separated by a distance of about 3 cm in this embodiment.

The front of the box-like portion 10 has a cut away section 34, 36 molded in each side thereof in the region of the piezo-electric sound generator 20. The cut away sections 34, 36 provide holes in the housing 2 to facilitate transmission of sound from the piezo-electric sound generator 20. The piezo-electric sound generator is attached to the interior surface of the housing to seal the edges of the cut away sections. The piezo-electric sound generator therefore closes the holes in the housing.

The box-like portion 10 may also comprise a drainage hole 38 to facilitate drainage of liquid from the housing.

The dividing plate 12 suitably provides a substantially water-tight seal between the box-like portion 10 and the main portion 8 of the main body 4 in order to prevent liquid entering the device through holes made by the cut away portion 34, 36 contacting the batteries (not shown). In addition, the dividing plate 12 separates the electronic apparatus from the battery compartment, such that when the cover 6 is removed to change the batteries, the electronic apparatus is not exposed.

The main body 4 provides a front wall 56, side walls 54 and a bottom wall 58 of the housing. The box-like portion 10 extends from the front wall 56 of the main body 4.

The cover 6 has a back wall 40, side walls 42, 44 and a top wall 46. Grooves 48 on the interior surfaces of the side walls 42, 44 co-operate with ridges 50 on the edges of the side walls 54 of the main body 4, to allow the cover 6 to slide into position on the main body 6.

Location of a detent 60 of the main body 4 in an opening 62 of the cover 6 maintains the cover 6 in a closed position on the main body 4.

A ridge 64 on the interior of the back wall 40 of the cover 6 is shaped to prevent the cover 6 being slid onto the main body 4 in the wrong direction.

The cover 6 comprises a lip 66 extending from the top wall 46. The lip 66 is designed to provide a splash-proof shield between the upper surfaces of the cover 6 and main body 4 when the device is arranged for use.

The housing also comprises ridges 92 extending from the surface thereof to provide a shield about the temperature sensors 16, 18 from the external environment when the device is in use.

Figure 11:
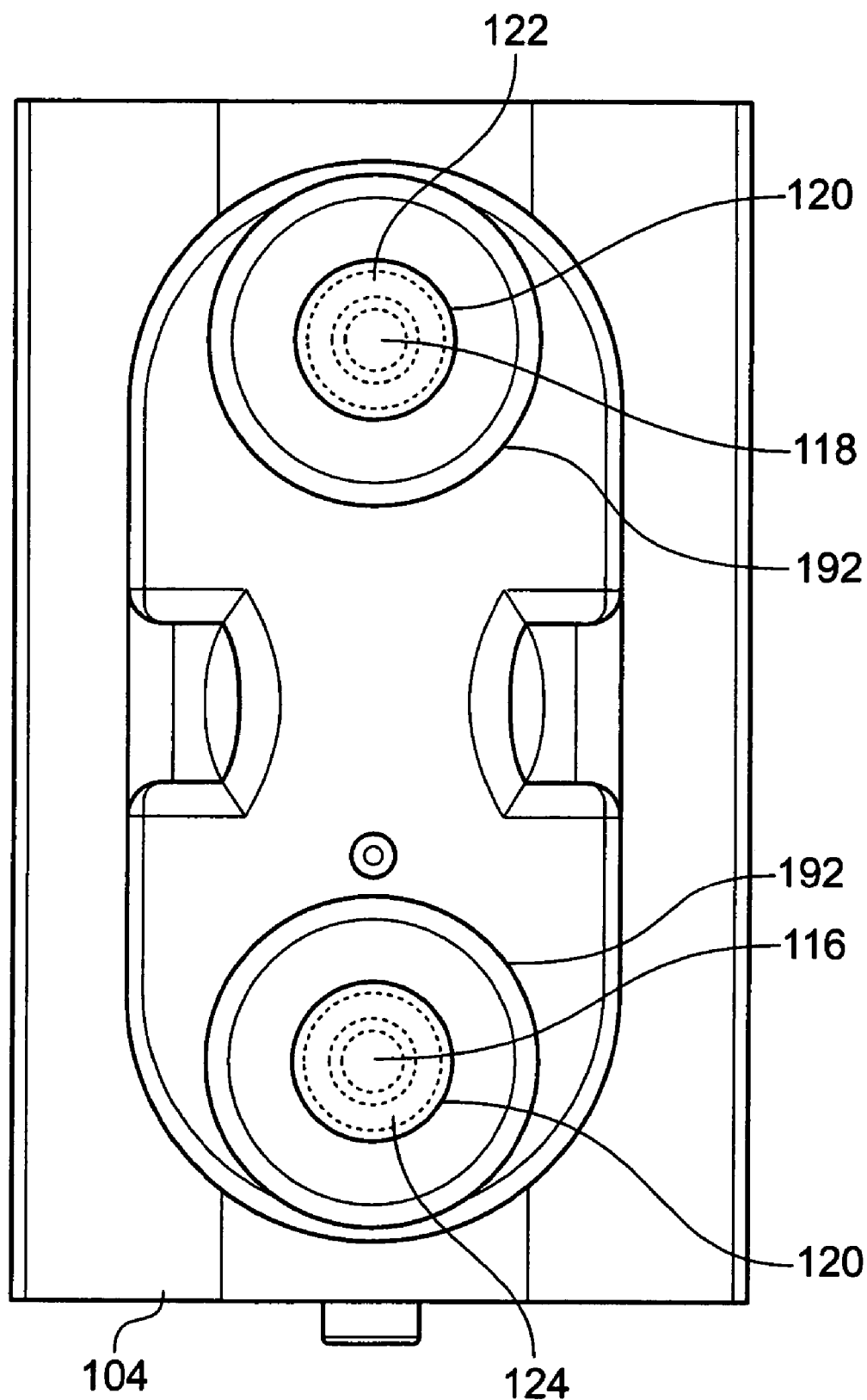
FIG. 11 is a front view of another embodiment of the liquid level indicator.

FIG. 11 shows a front view of another embodiment, broadly similar to that of FIGS. 1-10, except for a different configuration of magnets and temperature sensors. A housing main body 104 includes temperature sensors 116, 118 mounted coaxially with ring magnets 122, 124, both contained within a respective thin non-magnetic metal cup 120. Raised ridges 192 of circular configuration surround the metal cups 120 containing the coaxially-mounted temperature sensors 116,118 and ring magnets 122, 124. Foam pads (not shown) may be included within the ridges 192.

Figure 12:
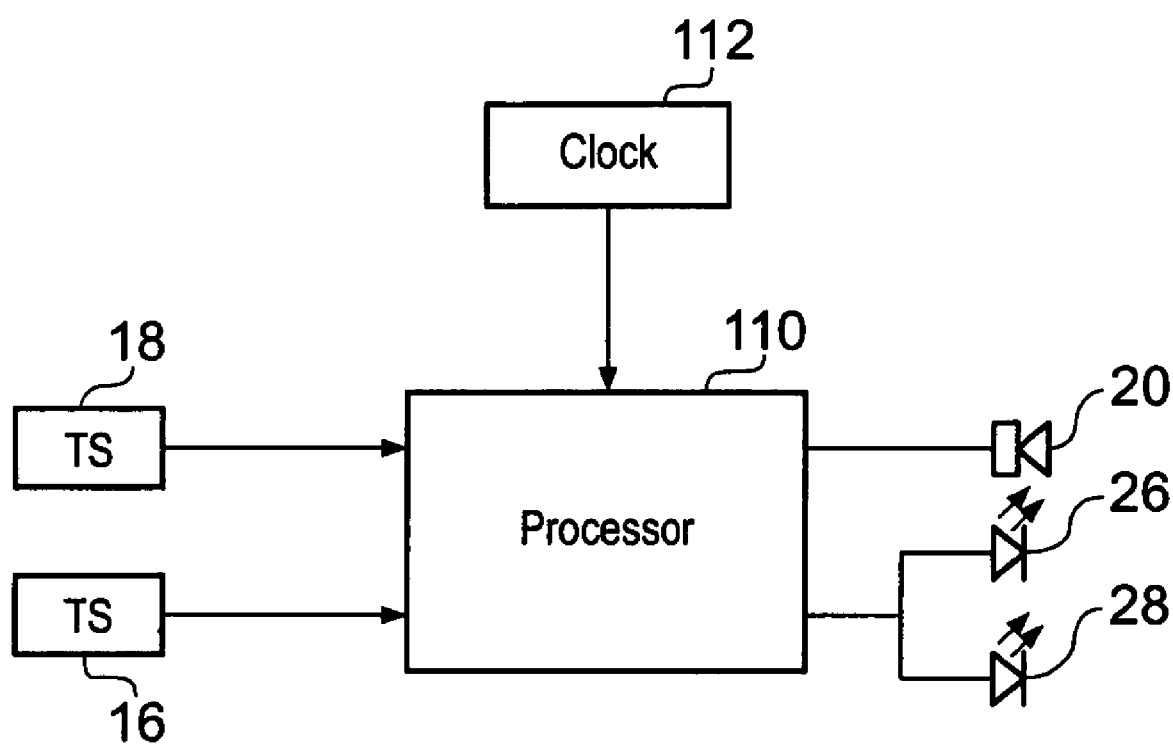
FIG. 12 is a block circuit diagram of the level detection circuit.

FIG. 12 shows a basic block circuit diagram of the control circuit of the device of FIGS. 1-10 or FIG. 11. The temperature sensors 16, 18 are connected to a processor 110, which also receives timing signals from a clock 112. The piezo-electric sound generator 20 receives an alert signal from the processor 110, and the LED's 26. 28 receive an operation-indicative signal from the processor 110.

Figure 13:
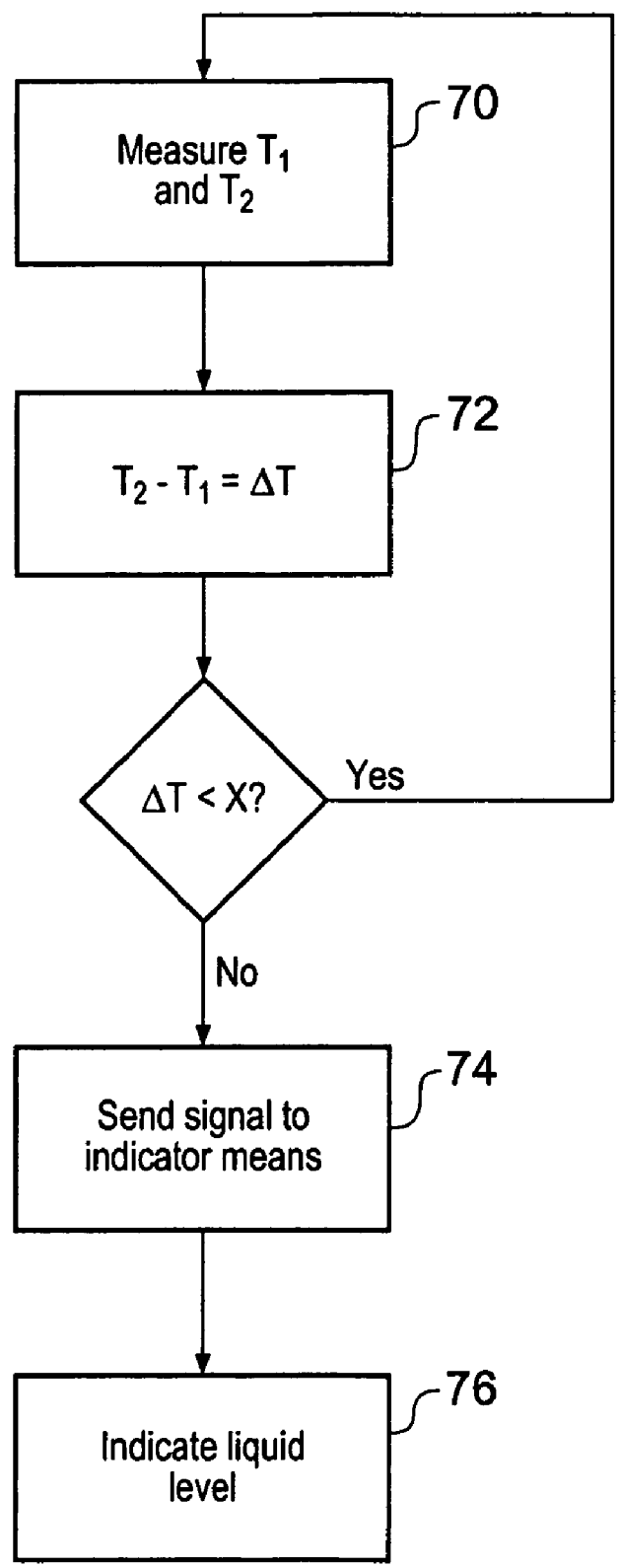
FIG. 13 is a flow diagram of a first embodiment of a method of indicating a liquid level of a volatile liquid in a pressurized container.

Possible modes of operation of the device of FIGS. 1-10 (or of FIG. 11) are illustrated in FIGS. 12 and 13 and will be described below, showing various operational methods of the processor 110.

In use, the device is located on the exterior surface of a pressurized container of a volatile liquid. Preferably, the device is located towards the bottom end of the container so the device can be used to indicate when the container is almost empty.

The device is arranged with the front wall 56 facing the container. The magnets 22, 24 hold the device on the container (not shown) and the temperature sensors 16, 18 contact the surface of the container. The device should be arranged such that one sensor 16, 18 is located above the other. Preferably, sensor 18 is located above sensor 16. More preferably, sensor 18 is located substantially vertically above sensor 16 when the device is arranged for use.

The method of operation of FIG. 13 is as follows. At step 70, each temperature sensor 16, 18 take a measure of the temperature of the container at substantially the same time, producing temperature measurements T1 and T2. At step 72, temperature T1 is subtracted from temperature T2 and the temperature difference in a particular direction ΔT is ascertained. ΔT is then compared to a set of pre-set conditions.

If ΔT is less than X, where X is for example 1° C., 0.5° C. or 0.05° C., then the temperature difference between T1 and T2 is considered to be insignificant and the device returns to step 70. Such a reading is assumed to indicate that the level of liquid is above the liquid level indicator or the container is not in use.

If ΔT is greater than X, then it is considered that the liquid level is at or below the position of the liquid level indicator and a signal is sent to the piezo-electric sound generator 20 (step 74) to sound an alarm (step 76).

Figure 14:
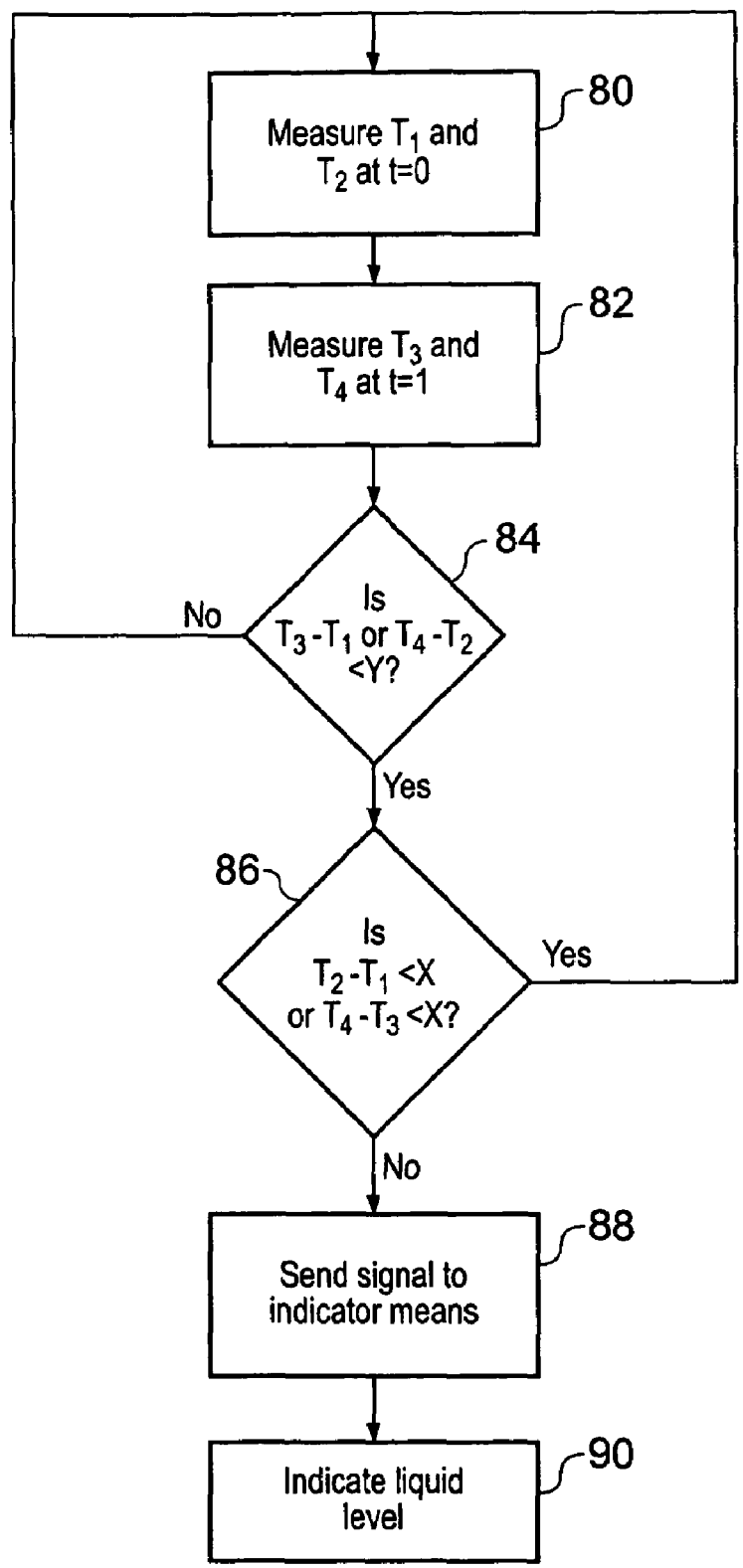
FIG. 14 is a flow diagram of a second embodiment of the method of a method of indicating a liquid level of a volatile liquid in a pressurized container.

The method of operation of FIG. 14 is as follows. At step 80, each temperature sensor 16, 18 takes a measure of the temperature of the container at substantially the same time t=0, producing temperature measurements T1 and T2. At step 82 each temperature sensor 16, 18 takes a measure of the temperature of the container at substantially the same time, at a later time t=1, producing temperature measurements T3 and T4. At step 84, T3 and T1, and T4 and T2 are compared to determine whether or not the overall temperature of the container is falling with time, where Y may be, for example, 1° C., 0.5° C., or 0.05° C. If the difference between T3 and T1 and the difference between T4 and T2 is less than Y then it is considered that the temperature of the container is not falling with time. This indicates that the container is not in use. If the difference between T3 and T1 or the difference between T4 and T2 is greater than Y then it is considered that the temperature of the container is falling with time. This indicates that the container is in use.

If the temperature of the container is falling with time, then the method will continue with the comparison steps 86. If the temperature of the container is not falling with time, then the method will return to step 80.

At step 86 T2 is compared to T1 and T4 is compared to T3. If ΔT is less than X, where X is for example 1° C., 0.5° C. or 0.05° C., then the temperature difference between T1 and T2 is considered to be insignificant and the device returns to step 80. Such a reading is assumed to indicate that the level of liquid is above the liquid level indicator or the container is not in use.

At step 86, if ΔT is greater than X then it is considered that the level of the liquid is at or below the position of the liquid level indicator and a signal is sent to the piezo-electric sound generator 20 (step 88) to sound an alarm (step 90).

Preferably, determination of liquid level is made within a predetermined time interval, such as 10 minutes, of activation of the device. Also, in a development of the method shown in FIG. 14, rather than comparing the temperature differences between the sensors (T2−T1 and T4−T3) to a fixed threshold X, the change in the temperature difference ((T2−T1)−(T4−T3)) is compared to a function of (for example, proportionality to) the drop in temperature (T3−T1, and/or T4−T2) determined in the first part of the detection technique. This overcomes any static difference in value due to tolerances of the components. Also, advantageously, once temperature drop and sensor temperature difference have been detected in accordance with the technique of FIG. 14 (or the change in temperature difference development described above), the process can be repeated periodically a predetermined number of times to ensure that the conditions detected continue to apply.

What is claimed is:

1. A liquid level indicator operable to determine the level of liquid within a container under ambient conditions using ambient temperature measurements, the indicator comprising:

a plurality of temperature sensors for making said ambient temperature measurements and each providing an output corresponding to the ambient temperature measurement, said sensors being spaced apart from one another;

a processor operable to process the output of at least two of the temperature sensors and provide an output corresponding to the processed output of the temperature sensors corresponding to the ambient temperature measurements; and an indicator for providing an indication of the liquid level within the container in response to an output of the processor;

wherein the processor is operable to respond to a difference between the outputs of the temperature sensors corresponding to the ambient temperature measurements, wherein the processor is operable to respond to at least one of the temperature sensors indicating that the ambient temperature is falling with time, and wherein the processor is operable to compare the difference between the outputs of the temperature sensors corresponding to the ambient temperature measurements against a pre-set temperature condition.

2. A liquid level indicator according to claim 1, wherein there are two temperature sensors spaced one above the other, when the indicator is in use.

3. A liquid level indicator according to claim 1, wherein one or more of the temperature sensors comprises a thermistor.

4. A liquid level indicator according to claim 1, wherein the processor is operable to process the output of the temperature sensors at pre-set time intervals.

5. A liquid level indicator according to claim 1, wherein the processor is operable to respond to the absolute output of at least one of the temperature sensors.

6. A liquid level indicator according to claim 1, wherein the processor includes a memory device for storing at least one output of at least one temperature sensor taken at a previous time interval, for processing with the most-recently obtained output.

7. A liquid level indicator according to claim 1, wherein the processor is operable to compare a change in the difference between the outputs of the temperature sensors with a quantity that is a function of the drop in temperature detected by a least one of the temperature sensors between a previous detection time and the most recent detection time.

8. A liquid level indicator according to claim 1, wherein the indicator comprises an audible alarm.

9. A liquid level indicator according to claim 8, wherein the audible alarm comprises a piezo-electric sound generator.

10. A liquid level indicator according to claim 1, comprising an operation indicative means for confirming that the liquid level indicator is operational.

11. A liquid level indicator according to claim 10, wherein the operation indicative means comprises one or more light emitting devices.

12. A liquid level indicator according to claim 1, including a housing comprising a main body and a cover attachable to the main body.

13. A liquid level indicator according to claim 12, wherein the housing includes attachment means for attaching the housing to a container whose liquid level is to be detected.

14. A liquid level indicator according to claim 13, wherein the attachment means comprises at least one magnet for attachment to a metallic container.

15. A liquid level indicator according to claim 14, wherein the magnet is a ring magnet arranged coaxially about a respective temperature sensor.

16. A liquid level indicator according to claim 1, wherein the temperature sensors are attachable to a container whose liquid level is to be detected, such that they are operative to sense ambient temperature of the container at spaced apart locations.

17. A liquid level indicator comprising a plurality of temperature sensors spaced apart from one another, a processor operable to process the output of at least two of the temperature sensors, and an indicator for providing an indication of the liquid level in response to an output of the processor; wherein the processor is operable to store at least one difference between outputs of the temperature sensors taken at a previous time interval, for processing with the most-recently obtained difference.

18. A method of indicating a liquid level of a volatile liquid in a pressurized container, the method comprising taking a first measurement indicative of temperature at a first point on the container, taking a second measurement indicative of temperature at a second point on the container, the second point being below the first point, processing the first and second measurements to determine the difference between the two measurements and then comparing the difference against a pre-set condition, sending a signal to an indicator dependent on the result of the comparison step, indicating the liquid level in accordance with the indicator signal, and taking a second set of temperature measurements at the first and second points at a later time, wherein the processing step further comprises comparing the measurement at the first and/or second point at the later time to the measurement at the same point at the earlier time to determine whether or not the overall temperature of the container is falling.

19. A method according to claim 18, wherein, if the temperature of the container is determined to be falling with time, the processing step may continue, whereas if the temperature is determined not to be falling with time, the method returns to the preceding measuring step.

* * * * *